US012260797B2

(12) United States Patent
Kang

(10) Patent No.: US 12,260,797 B2
(45) Date of Patent: Mar. 25, 2025

(54) DISPLAY DEVICE AND METHOD FOR BLOCKING EOS DEFECT THEREOF

(71) Applicant: LG ELECTRONICS INC., Seoul (KR)

(72) Inventor: Seok Heon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/496,288

(22) Filed: Oct. 27, 2023

(65) Prior Publication Data

US 2024/0420610 A1 Dec. 19, 2024

(30) Foreign Application Priority Data

Jun. 15, 2023 (KR) ........................ 10-2023-0076715

(51) Int. Cl.
*G09G 3/32* (2016.01)
*G09G 3/20* (2006.01)
*H01L 25/16* (2023.01)

(52) U.S. Cl.
CPC ......... *G09G 3/20* (2013.01); *G09G 2320/041* (2013.01); *G09G 2330/12* (2013.01)

(58) Field of Classification Search
CPC .................................................. G09G 2370/12
See application file for complete search history.

(56) References Cited

U.S. PATENT DOCUMENTS

| | | | | |
|---|---|---|---|---|
| 2008/0303785 | A1 | 12/2008 | Yun | |
| 2016/0210895 | A1* | 7/2016 | Fan | G09G 3/20 |
| 2017/0148375 | A1 | 5/2017 | Kim et al. | |
| 2017/0255437 | A1* | 9/2017 | Yu | H04N 21/41407 |
| 2021/0367366 | A1* | 11/2021 | Mayer | H01R 13/665 |

FOREIGN PATENT DOCUMENTS

| | | |
|---|---|---|
| KR | 200435646 | 2/2007 |
| KR | 1020190037898 | 4/2019 |
| KR | 10-2020-0127415 | 11/2020 |

OTHER PUBLICATIONS

Korean Intellectual Property Office Application No. 10-2023-0076715, Office Action dated Oct. 11, 2024, 9 pages.

* cited by examiner

*Primary Examiner* — Nan-Ying Yang
(74) *Attorney, Agent, or Firm* — LEE, HONG, DEGERMAN, KANG & WAIMEY

(57) ABSTRACT

Disclosed herein are a display device capable of preventing electrical over stress (EOS) defects by detecting and grounding EOS flowing in through an interface when a cable of external device is connected and a method for preventing EOS defects thereof. When a cable in an inactive mode exists in a plurality of cables, an EOS grounding unit may be controlled so that at least one connection pin corresponding to the cable in the inactive mode is grounded and when the cable in the inactive mode is changed to an active mode, the EOS grounding unit may be controlled so that at least one connection pin is ungrounded.

15 Claims, 11 Drawing Sheets

DISPLAY DEVICE AND METHOD FOR BLOCKING EOS DEFECT THEREOF

CROSS-REFERENCE TO RELATED APPLICATIONS

Pursuant to 35 U.S.C. § 119(a), this application claims the benefit of earlier filing date and right of priority to Korean Patent Application No. 10-2023-0076715, filed on Jun. 15, 2023, the contents of which are all hereby incorporated by reference herein in their entireties.

FIELD

The present disclosure relates to a display device capable of preventing electrical over stress (EOS) defects by detecting and grounding EOS flowing in through an interface when a cable of external device is connected, and a method for preventing EOS defects thereof.

BACKGROUND

In general, a display device is a device having a function of receiving, processing, and displaying an image that a user can view. The display device receives a broadcast signal selected by a user among broadcast signals transmitted from a broadcasting station, separates a video signal from the received signal, and displays the separated video signal on a display.

Recently, with the development of broadcasting technology and network technology, the functions of display devices have been significantly diversified, and the performance of the devices has been improved accordingly. That is, display devices have evolved to provide users with various other content as well as simply broadcast content.

For example, the display device may provide not only programs received from a broadcasting station but also game play, music enjoyment, Internet shopping, user-customized information, and the like using various applications. To perform these extended functions, the display device is basically connected to other devices or networks using various communication protocols, and can provide a user with a ubiquitous computing environment. That is, display devices have evolved into smart devices that enable connectivity to networks and constant computing.

Meanwhile, the display device may be connected to a plurality of external devices through cables to transmit/receive data.

However, in the display device, when a power environment is unstable or an external device malfunctions, Electrical Over Stress (EOS) may flow in through a cable and cause defects in an internal circuit such as a main board.

In addition, when there is an external device that is always connected to the display device through a cable, the probability of occurrence of defects due to EOS may greatly increase.

Therefore, in the future, it is necessary to develop a display device capable of preventing EOS defects by detecting and grounding EOS flowing in through a cable.

SUMMARY

An object of the present disclosure is to solve the above and other problems.

An object of the present disclosure is to provide a display device that, when there is a cable in an inactive mode among a plurality of cables, can block electrical over stress (EOS) flowing in through the cable in the inactive mode and prevent EOS defects, by grounding at least one connection pin corresponding to the cable in the inactive mode, and a method for preventing EOS defects thereof.

A display device according to an embodiment of the present disclosure may comprise an interface connected to a plurality of cables, an electrical over stress (EOS) grounding unit configured to ground EOS flowing in through the cables, and a controller configured to control the EOS grounding unit. The controller may control the EOS grounding unit so that, when a cable in an inactive mode exists in the plurality of cables, at least one connection pin corresponding to the cable in the inactive mode is grounded and control the EOS grounding unit so that, when the cable in the inactive mode is changed to an active mode, the at least one connection pin is ungrounded.

A method of preventing electrical over stress (EOS) defects of a display device according to an embodiment of the present disclosure may comprise an EOS detector and an EOS grounding unit checking whether a plurality of cables is connected, checking whether a cable in an inactive mode exists in the plurality of cables when the plurality of cable is connected, controlling the EOS grounding unit so that at least one connection pin corresponding to the cable in the inactive mode is grounded when the cable in the inactive mode exists, checking whether the cable in the inactive mode is changed to an active mode and controlling the EOS grounding unit so that the at least one connection pin is ungrounded when the cable is changed to the active mode.

According to an embodiment of the present disclosure, when there is a cable in an inactive mode among a plurality of cables, a display device can block electrical over stress (EOS) flowing in through the cable in the inactive mode and prevent EOS defects, by grounding at least one connection pin corresponding to the cable in the inactive mode.

In addition, the present disclosure can provide a user notification service such that a user quickly recognizes and deals with problems of the display device due to inflow of overvoltage, by detecting inflow of EOS through a connection line connected to a power input pin of a cable and providing an EOS inflow notification.

DETAILED DESCRIPTION OF THE PREFERRED EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
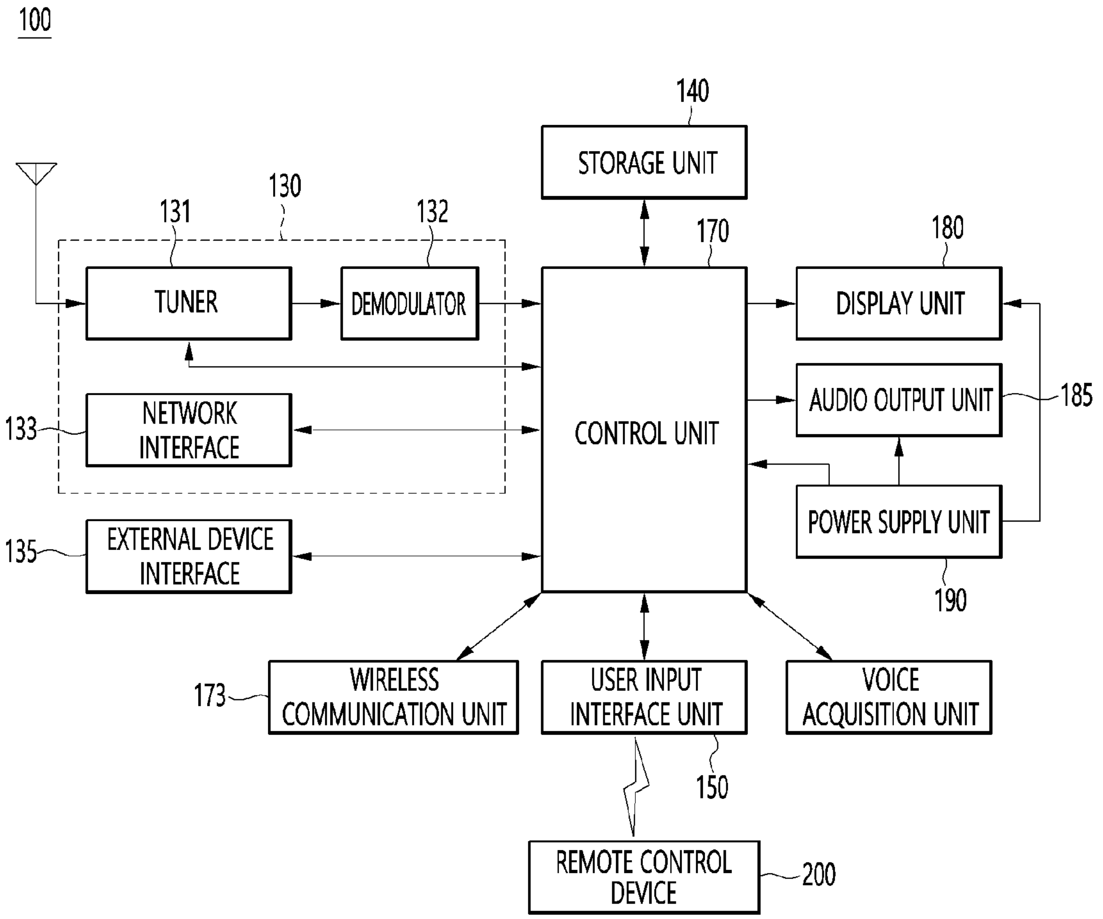
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

Figure 2:
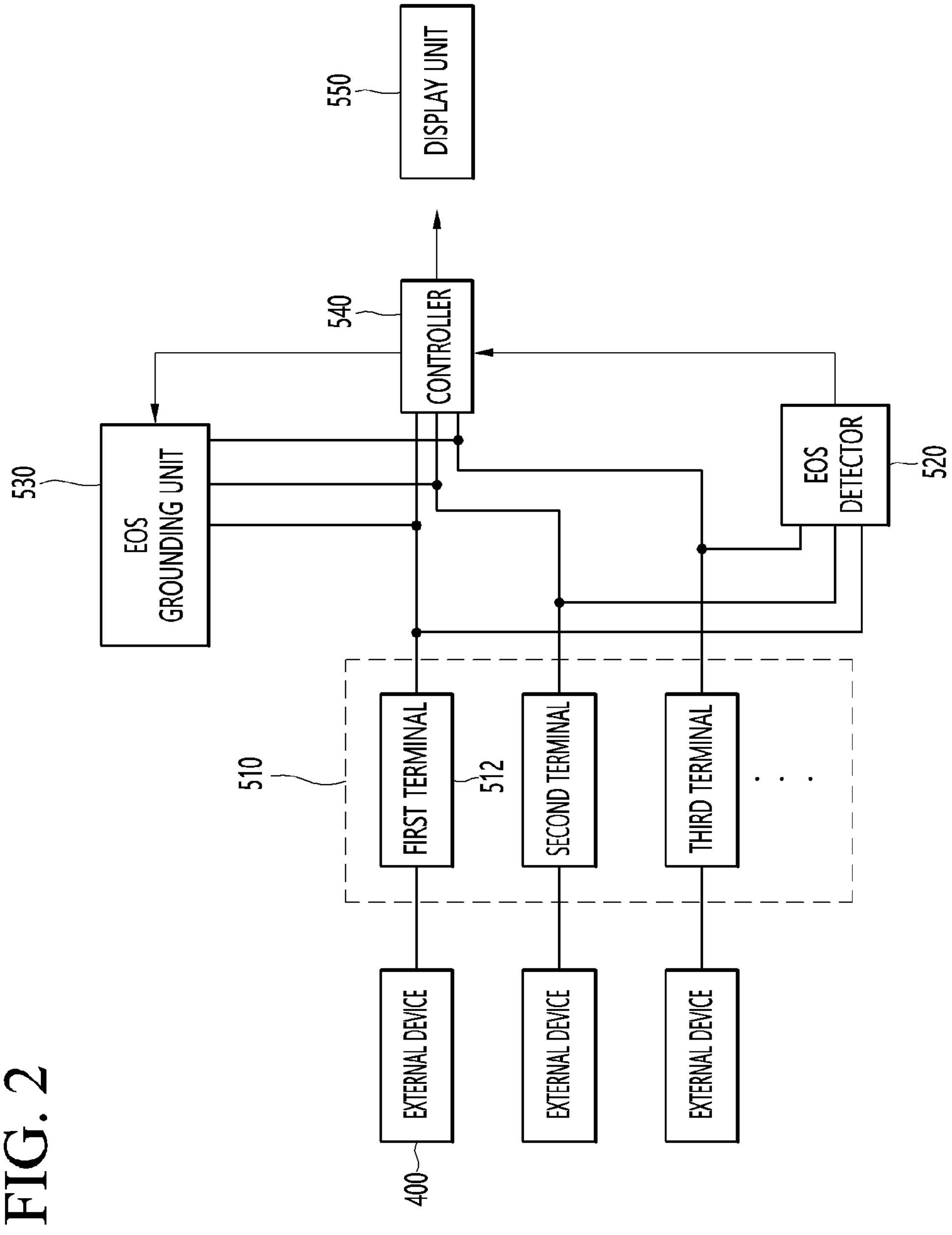
FIG. 2 is a block diagram illustrating a display device for preventing EOS defects according to an embodiment of the present disclosure.

FIG. 2 is a block diagram illustrating a display device for preventing EOS defects according to an embodiment of the present disclosure.

As shown in FIG. 2, the display device of the present disclosure may include an interface 510 connected to a plurality of cables, an EOS ground unit 530 for grounding EOS flowing in through the cables, and a controller 540 for controlling the EOS ground unit 530.

The interface 510 includes a plurality of external input terminals 512, and the external input terminals 512 may be connected to cable ports connected to an external device 400.

In addition, according to the present disclosure, when a plurality of connection lines connecting the external input terminal 512 connected to each cable and the controller 540 are disposed, one EOS grounding unit 530 may be connected to each connection line, one EOG grounding unit 530 may be connected to a plurality of connection lines, or one EOS grounding unit 530 may be connected to all connection lines.

Here, the controller 540 may control the EOS grounding unit 530 so that, when a cable in an inactive mode exists among the plurality of cables, at least one connection pin corresponding to the cable in an inactive mode is grounded, and, when the cable in the inactive mode is changed to an active mode, at least one connection pin is ungrounded.

For example, the grounded at least one connection pin may include a Transition Minimized Differential Signaling (TMDS) pin of a cable.

Subsequently, when the cable is in the active mode, the controller 540 may control the EOS grounding unit 530 so that the connection pin corresponding to the cable in the active mode is ungrounded.

When a user input for selecting at least one external input terminal 512 among the plurality of external input terminals 512 included in the interface 510 is received, the controller 540 may determine that the cable connected to the selected external input terminal 512 is in the active mode and the cables connected to the remaining non-selected external input terminals 512 are in the inactive mode.

In addition, the present disclosure may further include an EOS detector 520 for detecting EOS (Electrical Over Stress) flowing in through a cable.

According to the present disclosure, when a plurality of connection lines connecting the external input terminal 512 connected to each cable and the controller 540 are disposed, one EOS grounding unit 530 may be connected to each connection line, one EOG grounding unit 530 may be connected to a plurality of connection lines, or one EOS grounding unit 530 may be connected to all connection lines.

Here, the controller 540 may provide an EOS inflow notification to the display unit 550 when an EOS detection signal is input from the EOS detector 520.

In addition, the EOS detector 520 has one end connected to a connection line connecting a specific connection pin of the cable and the controller 540 to detect EOS flowing in through the cable and the other end connected to the controller 540 to transmit an EOS detection signal to the controller 540.

For example, the EOS detector 520 may include a first switch that switches when a voltage input from the specific connection pin of a cable is equal to or greater than a reference voltage, and a second switch which outputs an EOS detection signal corresponding to the switching signal of the first switch to the controller 540.

Here, the specific connection pin of the cable may be a power pin to which a power supply voltage is input, and the connection line may be a power line that transmits the power supply voltage input from the power pin to the controller 540.

Subsequently, the EOS grounding unit 530 may include a load switch having a first input terminal connected to a connection line connecting the connection pin of the cable and the controller 540, a second input terminal connected to the controller 540, and an output terminal connected to the ground.

Here, when a control signal of the controller 540 is input through the second input terminal, the EOS grounding unit 530 may connect the connection line connected to the first input terminal to the ground connected to the output terminal, so that the EOS flowing in through the connection line is grounded to the ground.

As such, according to the present disclosure, if a cable in an inactive mode exists among a plurality of cables, it is possible to block electrical over stress (EOS) flowing in through the cable in the inactive mode and prevent EOS defects, by grounding at least one connection pin corresponding to the cable in the inactive mode.

In addition, the present disclosure can provide a user notification service such that a user quickly recognizes and deals with problems of the display device due to inflow of overvoltage, by detecting inflow of EOS through a connection line connected to a power input pin of a cable and providing an EOS inflow notification.

Figure 3:
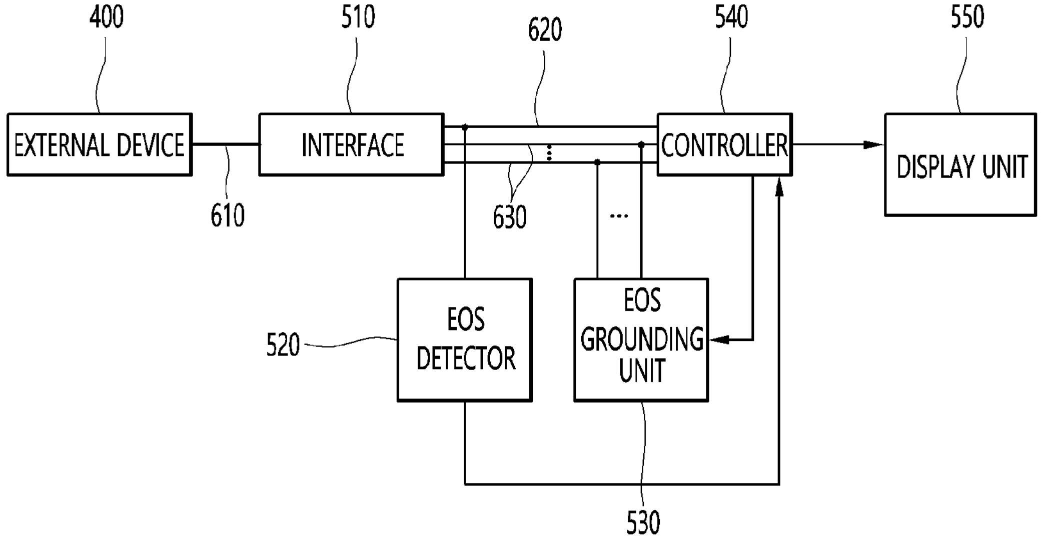
FIG. 3 is a block diagram illustrating a display device for preventing EOS defects according to another embodiment of the present disclosure.

FIG. 3 is a block diagram illustrating a display device for preventing EOS defects according to another embodiment of the present disclosure.

As shown in FIG. 3, the present disclosure may include an interface 510 to which at least one cable is connected, an EOS detector 520 for detecting Electrical Over Stress (EOS) flowing in through a cable 610, an EOS grounding unit 530 for grounding the EOS flowing in through the cable 610, and a controller 540 for controlling the EOS grounding unit 530.

For example, the cable 610 may include a high-definition multimedia interface (HDMI) cable connected to an external device 400, and the interface 510 may include a display port connected to at least one HDMI cable.

In this case, each connection pin of the HDMI cable may be connected to the controller 540 through a connection line between the interface 510 and the controller 540.

In addition, the present disclosure may include a first connection line 620 connecting a first connection pin of the cable 610 and the controller 540 through the interface 510, and a second connection line 630 connecting a second connection pine of the cable 610 and the controller 540 through the interface 510.

Here, the second connection line 630 may be connected so that the second connection pin and the second connection line 630 correspond to each other, when there are a plurality of second connection pins.

For example, the first connection pin of the cable 610 may be a power pin to which a power supply voltage is input, and the first connection line 620 is a power line to transmit the power supply voltage input from the power pin to the controller 540.

Subsequently, the EOS detector 520 may include a first switch that switches when a voltage input from a first connection pin of the cable 610 is equal to or greater than a reference voltage, and a second switch which outputs an EOS detection signal corresponding to the switching signal of the first switch to the controller 540.

Here, the first switch may output the switching signal to the second switch when the voltage input from the first connection pin of the cable 610 is about 5V or higher.

For example, the first switch may include a transistor having a source electrode connected to the first connection pin of the cable, a drain electrode connected to the second switch, and a gate electrode connected to a power source providing a reference voltage.

In this case, the source electrode of the first switch may be electrically connected to the first connection line 620 connecting the first connection pin of the cable 610 and the controller 540.

In addition, the second switch may be a transistor having a base electrode connected to the first switch, an emitter electrode connected to the controller, and a collector electrode connected to a power source providing a predetermined voltage.

In addition, the EOS grounding unit 530 may include a load switch having a first input terminal connected to the second connection line 630 connecting the second connection pin of the cable 610 and the controller 540, a second input terminal connected to the controller 540, and an output terminal connected to the ground.

Here, when an enable signal of the controller 540 is input to the second input terminal, the load switch may switch so that the first input terminal and the output terminal are connected, thereby grounding the EOS flowing in through the second connection pin of the cable to the ground.

As an embodiment, the EOS grounding unit 530 has one end connected to all second connection lines 630 except for the first connection line 620 and the other end connected to ground, and may connect all the second connection lines 630 to the ground in response to the control signal of the controller 540 so that the EOS flowing in through all the second connection lines 630 is grounded to the ground.

Here, when the control signal of the controller 540 is input, the EOS grounding unit 530 may simultaneously connect all the second connection lines 630 to the ground so that the EOS flowing in through all the second connection lines 630 is simultaneously connected to the ground.

In some cases, when the control signal of the controller 540 is input, the EOS grounding unit 530 may sequentially connect all the second connection lines 630 to the ground in correspondence with the input time of the control signal, so that all the second connection lines 630 may be sequentially grounded to the ground.

As another embodiment, the EOS grounding unit 530 has one end connected to some second connection lines 630 except for the first connection line 620 and the other end connected to the ground, and may connect some second connection lines 630 to the ground in response to the control signal of the controller 540 so that EOS flowing in through some second connection lines 630 may be grounded to the ground.

For example, when the cable 610 is an HDMI cable, some second connection lines 630 may be connected to at least one of a TMDS pin, a DDC pin, a CEC pin, an ARC pin, and a DDC/CEC ground pin of the HDMI cable.

As another example, when the cable 610 is an HDMI cable, some second connection lines 630 may include second connection lines 630 connected to the TMDS pin, DDC pin, CEC pin, ARC pin, and DDC/CEC ground pin of the HDMI cable, respectively.

Here, when the control signal of the controller 540 is input, the EOS grounding unit 530 may simultaneously connect some second connection lines 630 to the ground so that EOS flowing in through some second connection lines 630 is simultaneously grounded to the ground.

In some cases, when the control signal of the controller 540 is input, the EOS grounding unit 530 may sequentially connect some second connection lines 630 to the ground in correspondence with the input time of the control signal so that EOS flowing in through the some second connection lines 630 may be sequentially grounded to the ground.

Next, the controller 540 may check whether the cable 610 is in an inactive mode, control the EOS grounding unit 530 so that at least one of the second connection pins except for the first connection pin connected to the EOS detector 520 among the connection pins of the cable 610 is grounded when the cable 610 is in the inactive mode, and provide an EOS inflow notification when an EOS detection signal is input from the EOS detector 520.

Here, when checking whether the cable 610 is in the inactive mode, the controller 540 may check whether a data signal corresponding to a current screen mode is input/output through the cable 610 connected to the interface 510, and determine whether the cable 610 is in the inactive mode in accordance with the input/output of the data signal through the cable 610.

For example, the controller 540 may determine that the cable 610 is activated to recognize the cable 610 as an active mode when there is an input/output of a data signal through the cable 610, and determine that the cable 610 is deactivated to recognize the cable 610 as an inactive mode when there is no input/output of a data signal through the cable 610.

In some cases, when checking whether the cable 610 is in the inactive mode, the controller 540 may check the connection state of the cable 610 from a pre-stored cable connection state information table, and determine whether the cable 610 is deactivated based on the connection state of the cable 610.

Here, the controller 540 may determine that the cable 610 is activated to recognize the cable 610 as an active mode when the connection state of the cable 610 is an input/output activation state of the data signal, and determine that the cable 610 is deactivated to recognize the cable 610 as an inactive mode when the connection state of the cable 610 is an input/output deactivation state of the data signal.

In another case, when checking whether the cable 610 is in the inactive mode, the controller 540 may check a user input and determine whether the cable 610 is in the inactive mode based on the user input.

Here, the controller 540 may determine that the selected cable 610 is activated to recognize the cable 610 as an activation mode when the user input is selection of the cable 610, and determine that the deselected cable 610 is deactivated to recognize the cable 610 as an inactive mode when the user input is deselection of the cable 610.

Next, the controller 540 may control the EOS grounding unit 530 to unground the second connection pin when the cable 610 is in the active mode, and provide an EOS inflow notification when the EOS detection signal is input from the EOS detector 520.

Next, if the cable 610 is in the inactive mode when controlling the EOS grounding unit 530, the controller 540 may check whether a second connection pin to be grounded among the second connection pins except for the first connection pin connected to the EOS detector 520 among the connection pins of the cable 610 is preset, and control the EOS grounding unit 530 so that the preset second connection pin is grounded when the second connection pin to be grounded is preset.

Here, if the second connection pin to be grounded is not set when controlling the EOS grounding unit 530, the controller 540 may control the EOS grounding unit 530 so that all of the second connection pins except for the first connection pin are grounded.

In some cases, if the second connection pin to be grounded is not set when controlling the EOS grounding unit 530, the controller 540 may control the EOS grounding unit 530 so that a second connection pin designated as default among the second connection pins except for the first connection pin is grounded.

For example, the second connection pin designated as default may include a second connection pin having a condition that the incoming EOS strength is equal to or greater than a set voltage among the second connection pins of the cable.

As another example, the second connection pin designated as default may include a second connection pin having the highest incoming EOS strength among the second connection pins of the cable.

As another example, the second connection pin designated as default may include a second connection pin having a condition that the EOS inflow probability is 30% or more among the second connection pins of the cable.

As another example, the second connection pin designated as default may include a second connection pin having the highest EOS inflow probability among the second connection pins of the cable.

In addition, if the second connection pin to be grounded is not set when controlling the EOS grounding unit 530, the controller 540 may provide a notification message indicating that the second connection pin to be grounded is not set and a user selection button for selecting whether to set the second connection pin.

In some cases, the controller 540 may provide a recommendation message recommending a second connection pin to be grounded when a request for setting the second connection pin is received through the user selection button.

Here, the recommendation message may include a second connection pin having a condition that the incoming EOS strength is equal to or greater than the set voltage among the second connection pins of the cable.

For example, when the cable is an HDMI cable, the second connection pin having the condition that the EOS strength is equal to or greater than the set voltage may include the TMDS pin and DDC pin of the HDMI cable.

In some cases, the recommendation message may include a second connection pin having a condition that the EOS inflow probability is 30% or more among the second connection pins of the cable.

For example, when the cable is an HDMI cable, the second connection pin having the condition that the EOS inflow probability is 30% or more may include the TMDS pin and DDC pin of the HDMI cable.

As another case, the recommendation message may include a second connection pin having the highest EOS inflow probability among the second connection pins of the cable.

For example, when the cable is an HDMI cable, the second connection pin having the highest EOS inflow probability may include the TMDS pin of the HDMI cable.

As another case, the recommendation message may include a recommendation list including EOS strength information flowing in for each second connection pin item, and in the recommendation list, the second connection pin items may be arranged in ascending order of EOS strength.

Here, when a user input for selecting a second connection pin item in the recommendation list is received, the controller 540 may set a second connection pin to be grounded based on the selected second connection pin item.

Next, when the second connection pin to be grounded is preset, the controller 540 may check whether there are a plurality of preset second connection pins, and control the EOS grounding unit 530 so that the plurality of second connection pins are simultaneously grounded if there are a plurality of preset second connection pins.

In some cases, if the second connection pin to be grounded is preset, the controller 540 may check whether there are a plurality of preset second connection pins, obtain EOS strength information of the plurality of second connection pins if there are a plurality of preset second connection pins, and control the EOS grounding unit 530 so that the second connection pins are sequentially grounded according to the obtained EOS strength information.

Here, the controller 540 may control the EOS grounding unit 530 so that a second connection pin having the highest EOS strength is grounded first and a second connection pin having the lowest EOS strength is grounded last.

In one embodiment, the controller 540 may obtain power environment information if the cable 610 is in the inactive mode when controlling the EOS grounding unit 530, set a second connection pin to be grounded among the second connection pins except for the first connection pin connected to the EOS detector 520 among the connection pins of the cable 610 based on the obtained power environment information, and control the EOS grounding unit 530 so that the set second connection pin is grounded.

Here, the power environment information may include the number of malfunctions of the external device 400 connected to the cable 610, the number of power outages, and the number of overpower inputs.

At this time, the controller 540 may calculate power environment stability based on power environment information, control the EOS grounding unit 530 such that all the second connection pins except for the first connection pin connected to the EOS detector 520 are grounded when the power environment stability is less than a first reference value, and control the EOS grounding unit 530 such that some of the second connection pins except for the first connection pin connected to the EOS detector 520 are grounded when the power environment stability is equal to or greater than the first reference value and is less than a second reference value.

As such, according to the present disclosure, when the cable is in the inactive mode, it is possible to block EOS flowing in through the cable and prevent EOS defects, by grounding at least one of the second connection pins except for the first connection pin for detecting EOS among the connection pins of the cable.

In addition, the present disclosure can provide a user notification service such that a user quickly recognizes and deals with problems of the display device due to inflow of overvoltage, by detecting inflow of EOS through a connection line connected to a power input pin of a cable and providing an EOS inflow notification.

Figure 4:
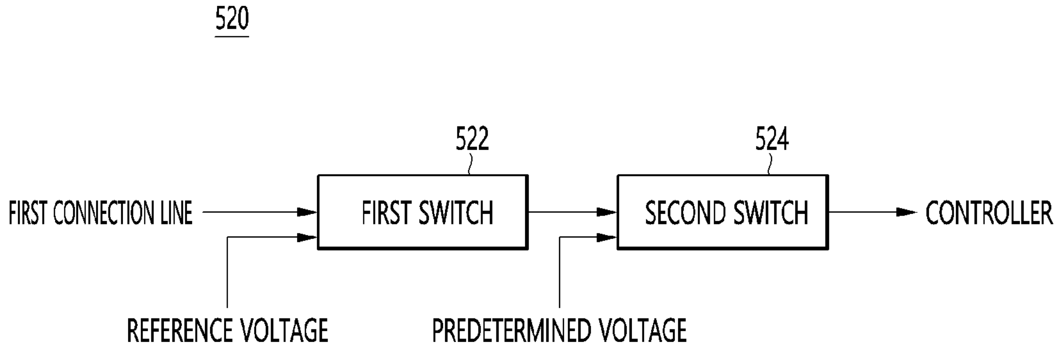
FIG. 4 is a view illustrating an EOS detector of a display device according to an embodiment of the present disclosure.

FIG. 4 is a view illustrating an EOS detector of a display device according to an embodiment of the present disclosure.

As shown in FIG. 4, the EOS detector 520 of the present disclosure may include a first switch 522 that switches when the voltage input from the first connection line connected to the first connection pin of the cable is equal to or greater than a reference voltage and a second switch 524 that outputs an EOS detection signal to the controller in response to the switching signal of the first switch 522.

Here, the first switch 522 may output the switching signal to the second switch when the voltage input from the first connection line connected to the first connection pin of the cable is about 5V or higher.

For example, the first switch 522 may include a transistor having a source electrode connected to the first connection pin of the cable, a drain electrode connected to the second switch, and a gate electrode connected to a power source providing a reference voltage.

In this case, the source electrode of the first switch 522 may be electrically connected to a first connection line connecting the first connection pin of the cable and the controller.

Also, the second switch 524 may be a transistor having a base electrode connected to the first switch 522, an emitter electrode connected to the controller, and a collector electrode connected to a power source providing a predetermined voltage.

Figure 5:
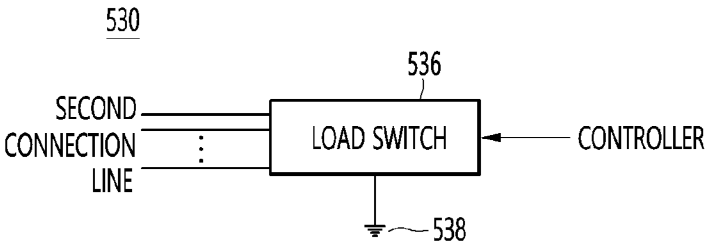
FIG. 5 is a view illustrating an EOS grounding unit of a display device according to an embodiment of the present disclosure.

FIG. 5 is a view illustrating an EOS grounding unit of a display device according to an embodiment of the present disclosure.

As shown in FIG. 5, the EOS grounding unit 530 of the present disclosure may include a load switch 536 having a first input end connected to the second connection line connecting the second connection pin of the cable and the controller, a second input end connected to the controller, and an output terminal connected to the ground 538.

Here, when an enable signal of the controller is input to the second input terminal, the load switch 536 may switch so that the first input terminal and the output terminal are connected, thereby grounding the EOS flowing in through the second connection pin of the cable to the ground 538.

As shown in FIG. 5, the EOS grounding unit 530 has one end connected to all second connection lines except for the first connection line and the other end connected to the ground 538 and may connect all the second connection lines to the ground 538 in response to the control signal of the controller so that the EOS flowing in through all the second connection lines is grounded to the ground.

Here, when the control signal from the controller is input, the EOS grounding unit 530 may simultaneously connect all the second connection lines to the ground 538 so that the EOS flowing in through all the second connection lines may be simultaneously grounded to the ground.

Figure 6:
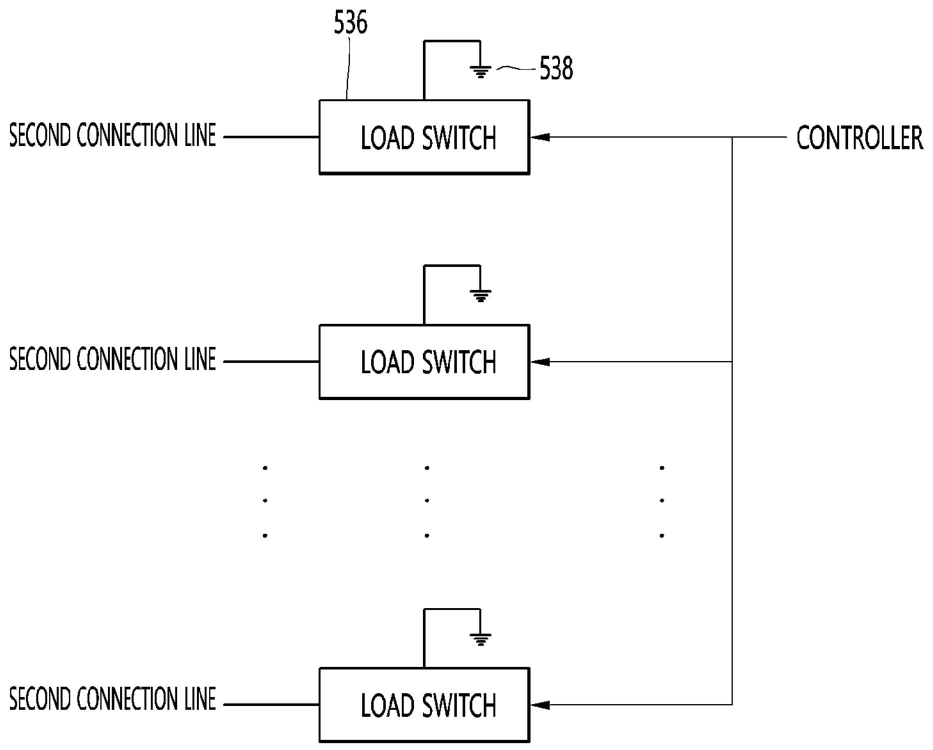
FIG. 6 is a view illustrating an EOS grounding unit of a display device according to another embodiment of the present disclosure.

FIG. 6 is a view illustrating an EOS grounding unit of a display device according to another embodiment of the present disclosure.

As shown in FIG. 6, in the EOS grounding unit 530 of the present disclosure, when a plurality of second connection lines connecting a plurality of second connection pins of the cable and the controller, one load switch 536 may be connected for each second connection line.

That is, the load switch 536 may be disposed to correspond to each second connection line.

For example, each load switch 536 may have a first input terminal connected to the second connection line, a second input terminal connected to the controller, and an output terminal connected to the ground 538.

Here, the controller may individually control each load switch 536.

In addition, when the control signal of the controller is input, the EOS grounding unit 530 of the present disclosure may sequentially connect all the second connection lines to the ground in correspondence with the input time of the control signal, so that the EOS flowing in through all the second connection lines is sequentially grounded to the ground.

In some cases, the EOS grounding unit 530 has one end connected to some second connection lines 630 except for the first connection line 620 and the other end connected to ground, and may connect some second connection lines 630 to the ground in response to the control signal of the controller 540 so that EOS flowing in through some second connection lines 630 may be grounded to the ground.

For example, when the control signal from the controller is input, the EOS grounding unit 530 may simultaneously ground some second connection lines to the ground so that the EOS flowing in through some second connection lines is simultaneously grounded to the ground.

In some cases, when the control signal of the controller is input, the EOS grounding unit 530 may sequentially connect some second connection lines to the ground in correspondence with the input time of the control signal so that the EOS flowing in through some second connection lines is sequentially grounded to the ground.

Figure 7:
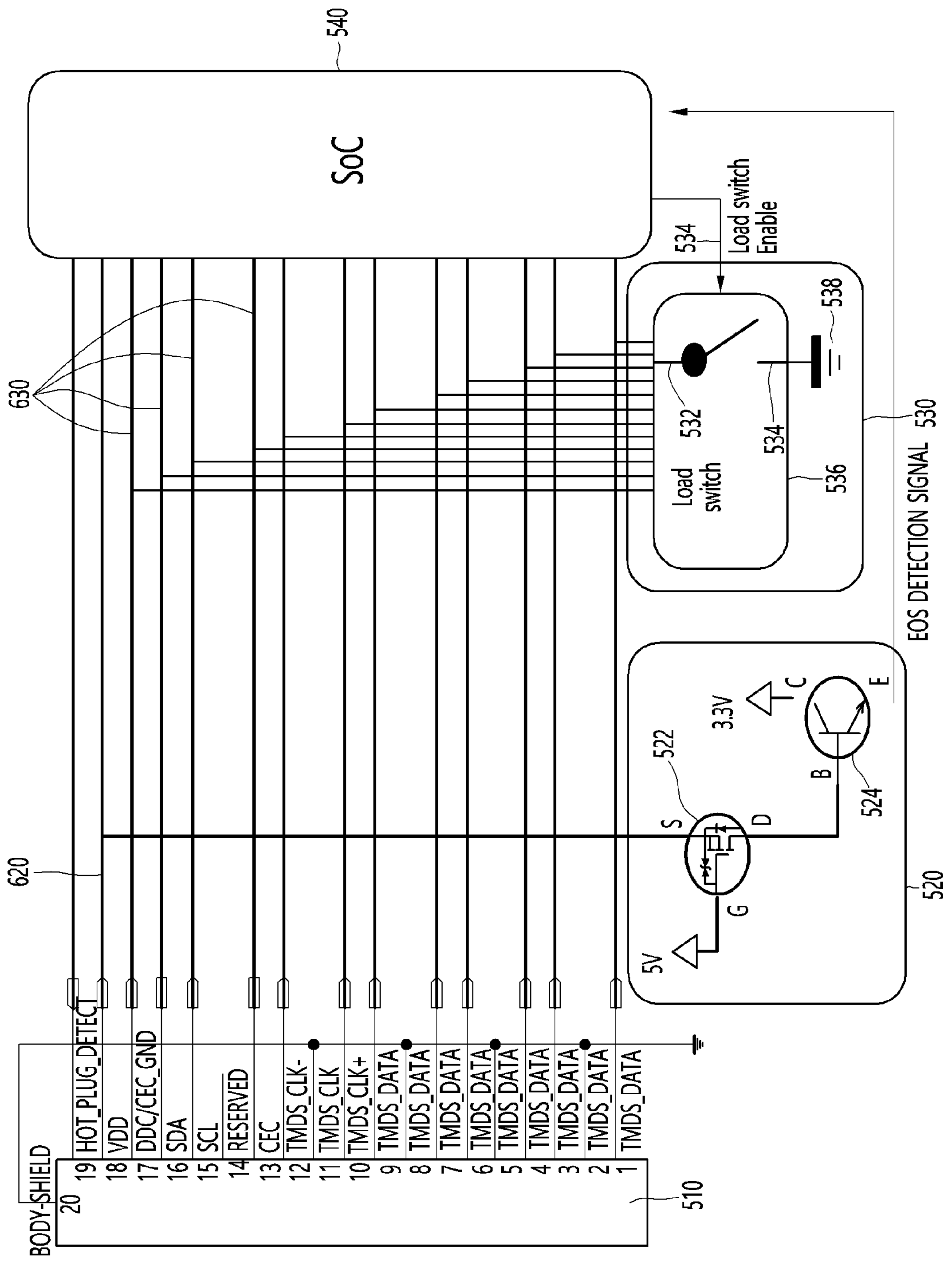
FIG. 7 is a view illustrating a connection relationship between an EOS detector and an EOS grounding unit of a display device according to an embodiment of the present disclosure.

FIG. 7 is a view illustrating a connection relationship between an EOS detector and an EOS grounding unit of a display device according to an embodiment of the present disclosure.

As shown in FIG. 7, the present disclosure may include an interface 510 to which at least one cable is connected, an EOS detector 520 for detecting EOS (Electrical Over Stress) flowing in through the cable, an EOS grounding unit 530 for grounding the EOS flowing in through the cable 610, and a controller 540 for controlling the EOS grounding unit 530.

Here, the interface 510 may include a display port connected to an HDMI cable.

In this case, each connection pin of the HDMI cable may be connected to the controller 540) through a first connection line 620 and a second connection line 630 between the interface 510 and the controller 540).

For example, the connection pins of the HDMI cable may include 8 TMDS pins, 2 DDC pins, 1 CES pin, 1 ARC pin, 1 DDC/CEC Ground pin, 4 GND pins, 2 HPD pins, etc.

The present disclosure may include a first connection line 620 connecting pin 18, which is the first connection pin of the cable, and the controller 540 through the interface 510, and a plurality of second connection lines 630 connecting the second connection pins of the cable, pins 1 to 17, and the controller 540 through the interface 510.

Here, the second connection lines 630 may be connected so that pins excluding the ground pin among pins 1 to 17 and the second connection lines 630 correspond to each other.

For example, pin 18, which is the first connection pin of the cable 610, may be an HPD pin to which a power supply voltage is input, and the first connection line 620 may be a power line that transmits the power supply voltage input from the HPD pin to the controller 540.

Pins 1 to 17, which are second connection pins of the cable, may include TMDS pins, DDC pins, CES pins, ARC pins, and DDC/CEC Ground pins to which data signals are input.

Subsequently, the EOS detector 520 may include a first switch 522 that switches when the voltage input through the first connection line 620 is equal to or greater than a reference voltage, and a second switch 524 that outputs the EOS detection signal to the controller 540) in response to the switching signal of the first switch 522.

Here, the first switch 522 may output the switching signal to the second switch 524 when the voltage input through the first connection line 620 is about 5V or higher.

For example, the first switch 522 may include a transistor having a source electrode connected to the first connection line 620, a drain electrode connected to the second switch 524, and a gate electrode connected to a power source providing a reference voltage.

In addition, the second switch 524 may be a transistor having a base electrode connected to the first switch 522, an emitter electrode connected to the controller 540), and a collector electrode connected to a power source providing a predetermined voltage.

In addition, the EOS grounding unit 530) may include a load switch 536 having a first input terminal connected to the second connection line 630 connecting the second connection pin of the cable and the controller 540, a second input terminal connected to the controller 540, and an output terminal connected to the ground 538.

Here, when an enable signal 534 of the controller 540 is input to the second input terminal, the load switch 536 may switch so that the first input terminal and the output terminal are connected, thereby grounding the EOS flowing in through the second connection line 630) to the ground 538.

As an embodiment, the EOS grounding unit 530) has one end connected to all the second connection lines 630 except for the first connection line 620 and the other end connected to the ground 538, and may connect all the second connection lines 630 to the ground 538 in response to the control signal of the controller 540) so that the EOS flowing in through all the second connection lines 630 may be grounded to the ground 538.

Here, when the control signal of the controller 540 is input, the EOS grounding unit 530) may simultaneously connect all the second connection lines 630 to the ground 538 so that the EOS flowing in through all the second connection lines 630 is simultaneously grounded to the ground 538.

In some cases, when the control signal of the controller 540 is input, the EOS grounding unit 530) may sequentially connect all the second connection lines 630 to the ground in correspondence with the input time of the control signal so that the EOS flowing in through all the second connection lines 630 may be sequentially grounded to the ground 538.

As another embodiment, the EOS grounding unit 530) has one end connected to some second connection lines 630 except for the first connection line 620 and the other end connected to the ground 538, and may connect some second connection lines 630 to the ground in response to the control signal of the controller 540 so that the EOS flowing in through some second connection lines 630 is grounded to the ground 538.

Here, when the control signal of the controller 540 is input, the EOS grounding unit 530 may simultaneously connect some second connection lines 630 to the ground 538 so that the EOS flowing in through some second connection lines 630 is simultaneously grounded to the ground 538.

In some cases, when the control signal of the controller 540 is input, the EOS grounding unit 530 may sequentially connect some second connection lines 630 to the ground in correspondence with the input time of the control signal so that the EOS flowing in through some second connection lines is sequentially grounded to the ground 538.

Figure 8:
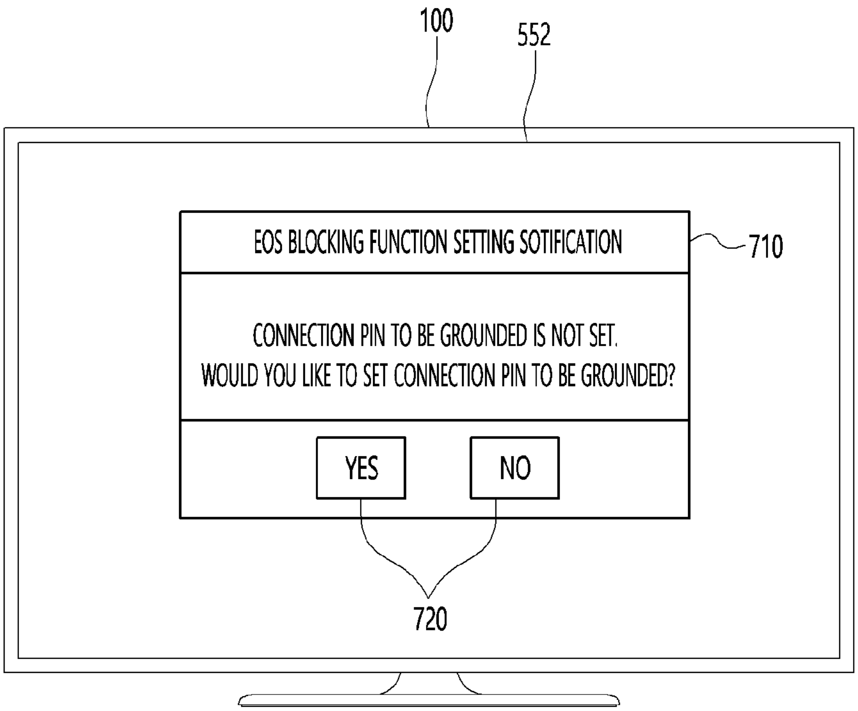
FIGS. 8 to 10 are views illustrating a notification message related to an EOS function of a display device according to an embodiment of the present disclosure.
Figure 9:
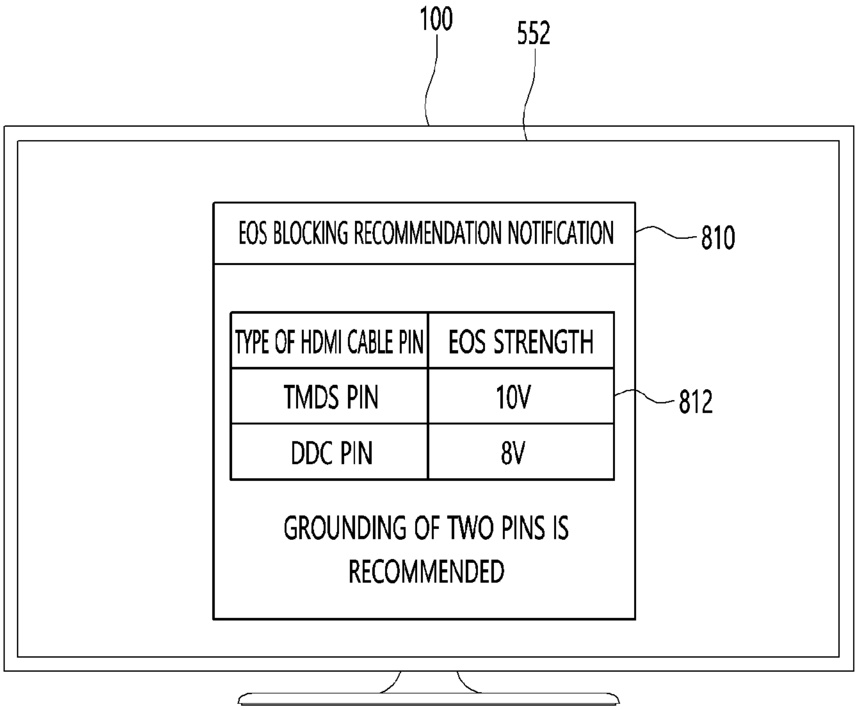
Figure 10:
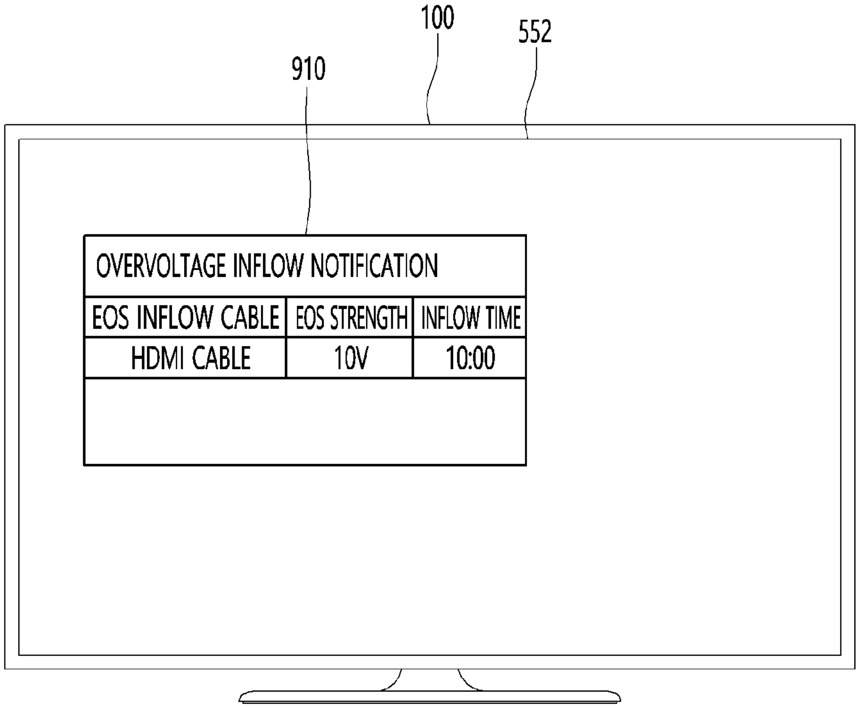

FIGS. 8 to 10 are views illustrating a notification message related to an EOS function of a display device according to an embodiment of the present disclosure.

As shown in FIGS. 8 and 9, according to the present disclosure, when the cable is in an inactive mode, it may be checked whether a second connection pin to be grounded among the second connection pins except for the first connection pin connected to the EOS detector among the connection pins of the cable is preset, and when the second connection pin to be grounded is preset, the preset second connection pin may be grounded.

Here, according to the present disclosure, if the second connection pin to be grounded is not set, all of the second connection pins except for the first connection pin may be grounded.

In some cases, according to the present disclosure, if the second connection pin to be grounded is not set, only the second connection pin designated as default among the second connection pins except for the first connection pin may be grounded.

For example, the second connection pin designated as default may include a second connection pin having a condition that the incoming EOS strength is equal to or greater than a set voltage among the second connection pins of the cable.

As another example, the second connection pin designated as default may include a second connection pin having the highest incoming EOS strength among the second connection pins of the cable.

As another example, the second connection pin designated as default may include a second connection pin having a condition that the EOS inflow probability is 30% or more among the second connection pins of the cable.

As another example, the second connection pin designated as default may include a second connection pin having the highest EOS inflow probability among the second connection pins of the cable.

As shown in FIG. 8, in the present disclosure, when the second connection pin to be grounded is not set, a notification message 710 notifying that the second connection pin to be grounded is not set and a user selection button 720 selecting whether to set the second connection pin may be generated and displayed on the display screen 552 of the display device 100.

As shown in FIG. 9, according to the present disclosure, when a request for setting the second connection pin is received through the user selection button 720, a recommendation message 810 recommending a second connection pin to be grounded may be generated and displayed on the display screen 552 of the display device 100.

Here, the recommendation message 810 may include a second connection pin having a condition that the incoming EOS strength is equal to or greater than a set voltage among the second connection pins of the cable.

For example, when the cable is an HDMI cable, the second connection pin having the condition that the EOS strength is equal to or greater than the set voltage may include the TMDS pin and DDC pin of the HDMI cable.

In some cases, the recommendation message 810 may include a second connection pin having a condition that the EOS inflow probability is 30% or more among the second connection pins of the cable.

For example, when the cable is an HDMI cable, the second connection pin having the condition that the EOS inflow probability is 30% or more may include the TMDS pin and DDC pin of the HDMI cable.

As another case, the recommendation message 810 may include a second connection pin having the highest EOS inflow probability among the second connection pins of the cable.

For example, when the cable is an HDMI cable, the second connection pin having the highest EOS inflow probability may include the TMDS pin of the HDMI cable.

As another case, the recommendation message 810 may include a recommendation list 812 including EOS strength information flowing in for each second connection pin item, and in the recommendation list, the second connection pin items may be arranged in ascending order of EOS strength.

Here, according to the present disclosure, when a user input for selecting a second connection pin item in the recommendation list is received, a second connection pin to be grounded may be set based on the selected second connection pin item.

Next, in the present disclosure, when the second connection pin to be grounded is preset, it may be checked whether there are a plurality of preset second connection pins, and if there are a plurality of preset second connection pins, the plurality of second connection pins may be simultaneously grounded.

In some cases, according to the present disclosure, if the second connection pin to be grounded is preset, it may be checked whether there are a plurality of preset second connection pins, EOS strength information of the plurality of second connection pins may be obtained if there are a plurality of preset second connection pins, and the second connection pins may be sequentially grounded according to the obtained EOS strength information.

Here, according to the present disclosure, a second connection pin having the highest EOS strength may be grounded first and a second connection pin having the lowest EOS strength may be grounded last.

As another case, according to the present disclosure, power environment information may be obtained if the cable is in the inactive mode, a second connection pin to be grounded among the second connection pins except for the first connection pin connected to the EOS detector among the connection pins of the cable may be set based on the obtained power environment information, and the set second connection pin may be grounded.

Here, in the present disclosure, power environment stability may be calculated based on power environment information, all the second connection pins except for the first connection pin connected to the EOS detector may be grounded when the power environment stability is less than a first reference value, and some of the second connection pins except for the first connection pin connected to the EOS detector may be grounded when the power environment stability is equal to or greater than the first reference value and is less than a second reference value.

In addition, as shown in FIG. 10, in the present disclosure, when the cable is in the inactive mode, at least one second connection pin among the second connection pins except for the first connection pin connected to the EOS detector among the connection pins of the cable may be grounded, and when the EOS detection signal is input from the EOS detector, an EOS inflow notification 910 may be generated and displayed on the display screen 552 of the display device 100.

Here, in the present disclosure, the second connection pin may be ungrounded when the cable is in the active mode, and an EOS inflow notification 910 may be generated and displayed on the display screen 552 of the display device 100 when an EOS detection signal is input from the EOS detector.

Figure 11:
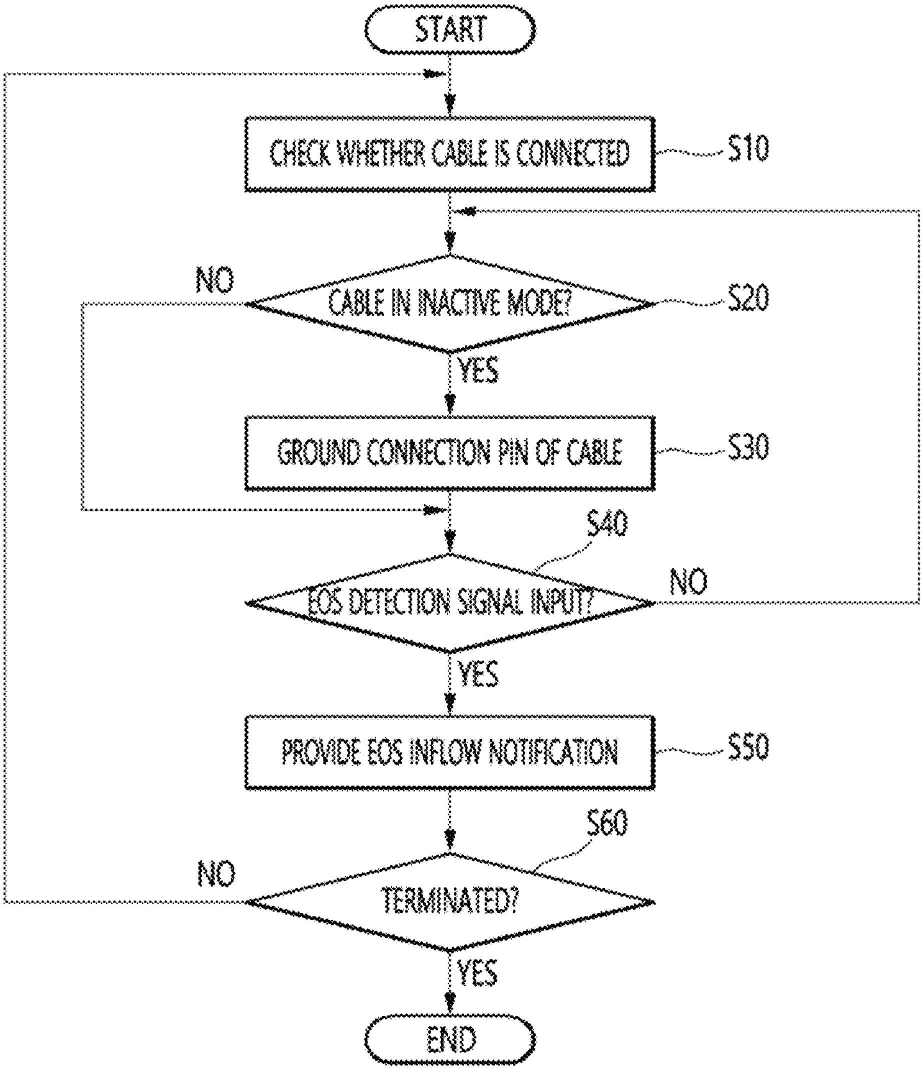
FIG. 11 is a flowchart illustrating a method for preventing EOS defects of a display device according to an embodiment of the present disclosure.

FIG. 11 is a flowchart illustrating a method for preventing EOS defects of a display device according to an embodiment of the present disclosure.

As shown in FIG. 11, according to the present disclosure, it may be checked whether at least one cable is connected (S10).

Also, according to the present disclosure, when at least one cable is connected, it may be checked whether the cable is in an inactive mode (S20).

Here, according to the present disclosure, it is possible to check whether a data signal corresponding to a current screen mode is input/output through the cable, and determine whether or not the cable is deactivated according to whether the data signal is input/output through the cable.

In some cases, according to the present disclosure, it is possible to check a cable connection state from a pre-stored cable connection state information table and to determine whether the cable is deactivated based on the cable connection state.

As another case, according to the present disclosure, a user input may be checked, and based on the user input, whether or not the cable is deactivated may be determined.

Next, according to the present disclosure, when the cable is in an inactive mode, at least one of second connection pins except for the first connection pin connected to the EOS detector among the connection pins of the cable may be grounded (S30).

Here, according to the present disclosure, when there are a plurality of second connection pins, the plurality of second connection pins may be simultaneously grounded.

In some cases, according to the present disclosure, if there are a plurality of second connection pins, EOS strength information of the plurality of second connection pins may be obtained, and the second connection pins may be sequentially grounded according to the obtained EOS strength information.

Subsequently, according to the present disclosure, whether an EOS detection signal is input may be checked (S40).

Also, according to the present disclosure, when the EOS detection signal is input, an EOS inflow notification may be provided (S50).

Next, according to the present disclosure, whether an EOS detection and grounding termination request is received is checked (S60), and if the EOS detection and grounding termination request is received, the EOS detection and grounding process may be terminated.

Meanwhile, according to the present disclosure, whether a plurality of cables are connected may be checked, and if the plurality of cables are connected, whether a cable in an inactive mode exists among the plurality of cables may be checked, and if the cable in the inactive mode exists, the EOS grounding unit may be controlled so that at least one connection pin corresponding to the cable in the inactive mode is grounded.

In addition, according to the present disclosure, it may be checked whether the cable in the inactive mode is changed to an active mode, and when the cable is changed to the active mode, the EOS ground unit may be controlled so that at least one connection pin is ungrounded.

Here, according to the present disclosure, when checking whether the cable in the inactive mode exists among the plurality of cables, it is checked whether a user input for selecting at least one external input terminal among a plurality of external input terminals is received, and when the user input for selecting the at least one external input terminal is received, a cable connected to the selected external input terminal may be determined to be in an active mode, and cables connected to the non-selected external input terminals may be determined to be in an inactive mode.

In addition, according to the present disclosure, when the EOS grounding unit is controlled, if the cable is in the inactive mode, at least one connection pin corresponding to the cable in the inactive mode may be connected to the ground so that the EOS flowing in through the cable in the inactive mode may be grounded to the ground.

Subsequently, according to the present disclosure, it is possible to check whether an EOS detection signal is input from the EOS detector, and to provide an EOS inflow notification when the EOS detection signal is input.

In the present disclosure, when a cable in an inactive mode exists in a plurality of cables, it is possible to block electrical over stress (EOS) flowing in through the cable in the inactive mode and to prevent EOS defects, by grounding at least one connection pin corresponding to the cable in the inactive mode.

In addition, the present disclosure can provide a user notification service such that a user quickly recognize and deal with problems of the display device due to inflow of overvoltage, by detecting inflow of EOS through a connection line connected to a power input pin of a cable and providing EOS inflow notification.

The present disclosure described above can be implemented as computer readable codes in a medium on which a program is recorded. A computer-readable medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. Also, the computer may include a processor 180 of an artificial intelligence device.

What is claimed is:

1. A display device comprising:

an interface connected to a plurality of cables;

an electrical over stress (EOS) grounding unit configured to ground EOS flowing in through the cables;

a controller configured to control the EOS grounding unit; and an EOS detector configured to detect the EOS flowing in through the cables and output an EOS detection signal to the controller, wherein the controller is further configured to control the EOS grounding unit so that, when a cable in an inactive mode exists in the plurality of cables, at least one connection pin corresponding to the cable in the inactive mode is grounded and to control the EOS grounding unit so that, when the cable in the inactive mode is changed to an active mode, the at least one connection pin is ungrounded, and wherein the EOS detector comprises:

a first switch configured to switch when a voltage input from a specific connection pin of the cable is equal to or greater than a reference voltage; and a second switch configured to output the EOS detection signal to the controller in response to a switching signal of the first switch.

2. The display device of claim 1, wherein the grounded at least one connection pin comprises a transition minimized differential signaling (TMDS) pin of the cable.

3. The display device of claim 1, wherein the controller is further configured to control the EOS grounding unit so that a connection pin corresponding to the cable in the active mode is ungrounded when the cable is in the active mode.

4. The display device of claim 1, wherein, when a user input for selecting at least an external input terminal of a plurality of external input terminals included in the interface is received, the controller is further configured to determine that a cable connected to the selected external input terminal is in an active mode and cables connected to the remaining non-selected external input terminals are in an inactive mode.

5. The display device of claim 1, wherein the controller is further configured to provide an EOS inflow notification when the EOS detection signal is input from the EOS detector.

6. The display device of claim 1, wherein the EOS detector has one side connected to a connection line connecting the specific connection pin of the cable and the controller to detect the EOS flowing in through the cable and another side connected to the controller to output the EOS detection signal to the controller.

7. The display device of claim 6, wherein the specific connection pin of the cable is a power pin to which a power supply voltage is input, and wherein the connection line is a power line for transmitting the power supply voltage input from the power pin to the controller.

8. The display device of 1, wherein the EOS grounding unit comprises a load switch having a first input terminal connected to a connection line connecting a connection pin of the cable and the controller, a second input terminal connected to the controller and an output terminal connected to a ground.

9. The display device of claim 8, wherein the EOS grounding unit is further configured to connect the connection line connected to the first input terminal to the ground connected to the output terminal and to ground EOS flowing in through the connection line to the ground when a control signal of the controller is input through the second input terminal.

10. A method of preventing electrical over stress (EOS) defects of a display device comprising an EOS detector and an EOS grounding unit, the method comprising:

checking whether a plurality of cables is connected;

checking whether a cable in an inactive mode exists in the plurality of cables when the plurality of cables is connected;

controlling the EOS grounding unit so that at least one connection pin corresponding to the cable in the inactive mode is grounded when the cable in the inactive mode exists;

checking whether the cable in the inactive mode is changed to an active mode;

controlling the EOS grounding unit so that the at least one connection pin is ungrounded when the cable is changed to the active mode; and checking whether an EOS detection signal is input from the EOS detector, wherein the EOS detector comprises:

a first switch configured to switch when a voltage input from a specific connection pin of the cable is equal to or greater than a reference voltage; and a second switch configured to output the EOS detection signal in response to a switching signal of the first switch.

11. The method of claim 10, wherein the checking whether the cable in the inactive mode exists in the plurality of cables comprises:

checking whether a user input for selecting at least an external input terminal of a plurality of external input terminals is received and determining that a cable connected to the selected external input terminal is in the active mode and cables connected to the remaining non-selected external input terminals are in the inactive mode when the user input for selecting the at external input terminal is received.

12. The method of claim 10, wherein the controlling the EOS grounding unit comprises connecting at least one connection pin corresponding to the cable in the inactive mode to a ground and grounding EOS flowing in through the cable in the inactive mode to the ground, when the cable is in the inactive mode.

13. The method of claim 12, wherein the grounded at least one connection pin comprises a transition minimized differential signaling (TMDS) pin of the cable.

14. The method of claim 10, further comprising:

providing an EOS inflow notification when the EOS detection signal is input.

15. A display device comprising:

an interface connected to a plurality of cables;

an electrical over stress (EOS) detector configured to detect EOS flowing in through the cables; and a controller configured to receive an EOS detection signal from the EOS detector, wherein the controller is further configured to provide an EOS inflow notification when the EOS detection signal is input from the EOS detector, and wherein the EOS detector comprises:

a first switch configured to switch when a voltage input from a specific connection pin of a cable of the plurality of cables is equal to or greater than a reference voltage; and a second switch configured to output the EOS detection signal to the controller in response to a switching signal of the first switch.

* * * * *